United States Patent [19]

Wells et al.

[11] Patent Number: 4,473,004
[45] Date of Patent: Sep. 25, 1984

[54] HUMPBACK OVEN-BROILER

[75] Inventors: Harold D. Wells, St. Louis County; Dennis L. Wagner, Ballwin, both of Mo.

[73] Assignee: Pet Incorporated, St. Louis, Mo.

[21] Appl. No.: 423,647

[22] Filed: Sep. 27, 1982

Related U.S. Application Data

[62] Division of Ser. No. 228,278, Jan. 26, 1981, Pat. No. 4,366,177.

[51] Int. Cl.³ .......................................... A47J 37/04
[52] U.S. Cl. .................................... 99/386; 99/400; 99/401; 99/443 C; 99/446; 99/447; 126/21 R; 219/388; 432/152
[58] Field of Search .................. 126/19 R, 21 R; 219/388, 400, 345; 432/152, 153; 99/386, 443 C, 401, 447, 446, 444, 400; 426/243, 523

[56] References Cited

U.S. PATENT DOCUMENTS

| | | | |
|---|---|---|---|
| 1,641,313 | 9/1927 | Bonaparte | 99/443 C |
| 2,529,253 | 11/1950 | Hoffman | 99/386 |
| 2,674,809 | 4/1954 | Meienhofer | 219/388 |
| 2,689,517 | 9/1954 | Angelus | 99/386 |
| 2,942,562 | 6/1960 | Luc | 426/243 |
| 3,449,546 | 6/1969 | Dhoble | 219/388 |
| 3,736,860 | 6/1973 | Vischer | 99/443 C |
| 3,802,832 | 4/1974 | Nicolaus | 99/443 C |
| 3,809,859 | 5/1974 | Wells | 219/345 |
| 3,993,788 | 11/1976 | Longenecker | 426/243 |
| 4,008,996 | 2/1977 | Wells | 126/19 R X |
| 4,121,509 | 10/1978 | Baker et al. | 99/443 C |
| 4,152,631 | 5/1979 | Weinberg | 318/314 |
| 4,245,613 | 1/1981 | Wells et al. | 126/19 R |

FOREIGN PATENT DOCUMENTS

736724 11/1932 France ............................ 99/443 C

Primary Examiner—Billy J. Wilhite
Attorney, Agent, or Firm—Kalish & Gilster

[57] ABSTRACT

An oven-broiler includes modular units each having a tunnel-form cooking chamber formed by a tubular inner member, a heating arrangement extending around at least portions of the inner member for heating same to predetermined temperatures for emission of infrared radiant energy into the chamber for heating of products conveyed therein from one end to the other. The heating arrangement is either electrically energized, thermostatically controlled panels or a gas combustion chamber. The heating arrangement and tubular inner member are enclosed by a tubular outer member supported by a caster-equipped base. Such a modular unit is joinable into a multiple-unit oven of various possible lengths by securement of flanges at opposite ends. Preferably, extensions from opposite ends of the oven orient the entrance and exit for the tunnel-form chamber below floor level of the chamber to entrap a heated oxygen-starved atmosphere therein for substantially flameless heating, cooking, or broiling, and particularly, food products of a greasy nature, such as steaks and chops.

24 Claims, 17 Drawing Figures

HUMPBACK OVEN-BROILER

This is a divisional application of Ser. No. 228,278 filed Jan. 26, 1981 now U.S. Pat. No. 4,366,177 filed Dec. 28, 1982.

BACKGROUND AND SUMMARY OF THE INVENTION

The invention relates to cooking or heating apparatus, and, more particularly, to an improved tunnel oven or broiler for heating food or other products while they are being conveyed through a tunnel within a preselected time.

It has come to be expected in restaurant, industrial, and institutional cooking that greasy foods such as hamburgers, steaks, chops, etc. will tend to flare up and char as grease rendered by the food catches on fire, as will occur when exposed to temperature sufficient for broiling, for example. This is particularly so for beef, pork, and lamb but also occurs with fowl, including chicken, turkey, and duck.

Avoiding such flaming or flaring up of greasy foods is rendered extremely difficult since meat grease, for example, may begin vaporizing at only about 150° F. Therefore, the exposure of grease vapors to even the modest temperature present in ovens and broilers is likely to produce combustion.

One unfortunate aspect of such flaring or flaming of meat and grease in an oven is difficulty, if not impossibility, of accurately maintaining temperature control. This is because the flames and flaring up cause improper response by temperature sensing elements not indicative of the true temperature in the oven.

Further, there is now research data tending to suggest that exposure of food products to direct flame may cause conversion of their organic constituents, or food additives, or preservatives, to carcinogens. Some researchers have even gone so far as to present evidence that the exposure of meat to a grilling surface in excess of 350° F., as on a grill or griddle, may tend to produce carcinogenic substances. The American Cancer Society has suggested that the impingement of flame on meat promotes carcinogens.

As a consequence of the mounting evidence that direct exposure of meats and other food products to flame may be harmful, it is already forbidden in some countries for restaurants or other commercial establishments to serve food which has been cooked by direct exposure to flame, even though this practice is ubiquitous in the United States of America.

In recent years, tunnel ovens have been developed for use in the fast food and industrial cooking field, such as disclosed in Wells U.S. Pat. No. 4,008,996 and Wells U.S. patent application Ser. No. 956,869 now U.S. Pat. No. 4,245,613. Ovens of this type cook by infrared emission from hearth and roof panels within the tunnel such as disclosed in Wells U.S. Pat. No. 3,809,859, for example.

These tunnel ovens have provided a revolutionary new way of cooking which preserves the taste, succulence and moisture of food products. They do not utilize heated air for cooking which tends to dry out food.

An infrared tunnel oven of this type can be used for cooking of steaks, chops, etc. by conveying them through the oven in a pan. This avoids dropping of the grease and cooking of such meats in this way provides an excellent result from the standpoint of preservation and taste of the food product. But, like microwave cooking, the appearance of the cooked product is not fully acceptable in some usages, since it lacks the browned appearance which some customers have grown to accept. Further, the use of pans for conveying the food product through the tunnel oven means that there are pans to be handled and cleaned.

It is desired to provide infrared cooking of various foods, but particularly greasy foods such as steaks, chops, etc., by directly conveying them through a tunnel for exposure to infrared heating, but at temperatures which are sufficiently high that the food will undergo heating of a nature that it undergoes conversion to a most appetizing appearance. Steaks, for example, will take on a degree of rich, taste-tantalizing coloration or browning which is not only acceptable but very appealing to customers.

It has now been discovered by the present inventor that meats, chops, and other greasy food products can now be cooked by infrared heating, with all of its many advantages, but in an oxygen-starved atmosphere which substantially precludes the flaming and flaring of grease, or grease vapors, and the resultant exposure of the food products to direct flame. It has also been found that certain other products can be cooked under such conditions in which otherwise would tend to burn, such as diary products.

Quite apart from the matter of exposing food products to flame, one of the more pressing needs in the field of industrial cooking is to provide a cooking apparatus capable of being utilized in food processing operations, and particularly those where the approval of the U.S. Department of Agriculture is required to satisfy concerns for the sanitary character of the cooking apparatus. In this regard, prior art arrangements of tunnel ovens have not been readily conducive to meeting the stringent U.S.D.A. food processing requirements even though meeting exemplary standards for food service usages.

An object of the present invention is the provision of a tunnel oven-broiler, referred to herein as an infrared tunnel oven, of an improved type for infrared heating of food or other products.

It is a further object of the present invention to provide such a tunnel oven which makes possible substantially flameless cooking of food products, and particularly greasy or other food products which tend to burn or flame up during cooking.

A still further object of the present invention is the provision of such a tunnel oven which provides oxygen-starved cooking of food products to prevent flaring, flaming, grease fires, and other deleterious effects of cooking in very oxydizing atmospheres.

Another object of the present invention is the provision of such a tunnel oven which can provide infrared heating of food and other products at temperatures heretofore not utilizable in tunnel ovens, as well as at different upper and lower temperatures within the tunnel oven having a greater possible differential than heretofore achievable.

Another object of the invention is the provision of such a tunnel oven which provides and promotes temperature control and consistency of cooking for more uniform and more reproducible cooking of food products.

Another object of the invention is the provision of such a tunnel oven which is easily cleanable and capable of meeting stringent sanitary requirements, as well as being of a self-cleaning nature.

A further object of the invention is the provision of such a tunnel oven which can provide continuous heating of food or other products, and with such products being continuously fed into and delivered from the oven, yet is extremely energy efficient, as contrasted with prior art ovens.

A further object of the invention is the provision of such a tunnel oven which is of a modular nature, being adapted for convenient, rapid assembly of modules into desired lengths, as well as equally convenient disassembly or separation of the modules for cleaning, alteration of length, or adaption for different purposes.

Among still other objects of the present invention include the provision of such a tunnel oven which can be relatively economically and simply manufactured, which is reliable and of an extremely durable, long-lasting configuration, and which is very well suited for heavy duty, high-volume commercial usage.

Other objects and features of the invention are in part apparent and in part pointed out hereinbelow.

BRIEF DESCRIPTION OF THE DRAWINGS

Corresponding reference characters indicate corresponding parts throughout the several views of the drawings. de

BRIEF DESCRIPTION OF THE PREFERRED EMBODIMENTS

Referring now to the drawings by reference characters, particularly to FIGS. 1–5, designated at A is a first embodiment of an oven-broiler of the invention, being of the tunnel type and characterized by a cooking chamber 21 in the form of a tunnel extending between an entrance 22 and an exit 23. Food products are carried through tunnel 21 of rectangular cross-section by a conveyor, designated generally at 25, having an endless conveyor including a main horizontal reach 26 and inclined reaches 27, 28 at the entrance and exit, respectively. It also includes a return reach 30 having inclined portions 31, 32 which terminate at rollers 34, 35 at the opposite ends of the oven-broiler A. Preferably, but not necessarily, return reach, as shown, extends within tunnel 21 so that it is heated by return travel therein. Thus, the returning conveyor portions are not at the point of emergence at entrance 22, where the conveyor passes around roller 34 for picking up food products to be heated.

While the new oven-broiler is of a most unusual appearance, it is intended for carrying out various known kinds of heating or cooking of food products, including but not limited to warming, baking, grilling, and broiling, but in accordance with the new method of the invention providing especially superlative flameless cooking.

Primarily, the oven is intended for heat and serve purposes wherein partially prepared or frozen foods may be subjected to requisite heating for prompt serving of the same. Hence, the oven is particularly adapted for what is known as fast food service, and especially where there is a demand for servings in relative volume in minimum time. Oven A has manifest applications for industrial and commercial use. Therefore, it is to be understood that any description hereinbelow of the use of said oven in conjunction with the cooking or other heating of food articles or items is merely exemplary and is not to be unterpreted as restrictive. Although various food articles and other comestibles may be heated within the oven, as for the cooking of the same, other non-food items or articles may well be heated in the oven to advantageous effect.

Oven-broiler A is especially useful for the broiling of steaks, chops and meats of all kinds, as well as fish and various other greasy food products which have a tendency to burn or flame up during heating at high temperatures, such as beef, pork, and lamb.

When being cooked in an oven-broiler of the invention, such greasy products can be heated to the temperatures for broiling or baking without causing flaming and flaring up of the type ordinarily experienced, whereby the products are cooked without exposure to direct flame and without being burned or exposed to temperatures which cause carbonation or charring of the food. This not only provides for an entirely stable environment within the oven chamber 21 but also cooking the products so that not only the food product but any additives therein are not likely to be chemically converted into a carcinogenic form, while nevertheless providing a cooked product which is very appetizing in appearance and preserving the intrinsic character of the particular food product, whether it be steak, chops, etc.

Since the new oven may be utilized not only for broiling but also for baking as well as various other forms of cooking and heating of food products (although not being so limited to the heating of such food products), it may be termed generally for purposes herein an oven. Thus, it is understood that the term oven is used herein without intending to limit the new apparatus to applications which are characteristic solely of ovens used for cooking food.

When used for the broiling of steaks, chops and other cuts of meat, such products may be applied directly to the conveyor at entrance 24 without use of plates, trays, or other dishes, adhering instead to the belt by friction and being carried up the inclined conveyor section 27 and then into tunnel 21. To provide additional gripping of the food products by the inclined reach 27 of the conveyor as it enters the oven, the conveyor may have a belt providing projections, ribs, or other means for engaging the chops, steaks, or the like. Due to the inclined nature of conveyor portions 27, 28, it will be apparent that the new oven is particularly intended for cooking food products which can be caused to be conveyed by direct application to the conveyor and which will adhere to the surface of the conveyor. But, it is within the purview of the invention to provide alternative conveyor belt arrangements which can carry trays, pans, or other supporting receptacles, etc., for cooking of other food products.

A preferred angle of inclination for inclined reaches 27, 28 with respect to horizontal is from about 30° to about 40° and with 40° being most specifically preferred.

Merely for purposes of illustration, conveyor 25 is represented as comprised of two side-by-side belts 25a, 25b (See FIGS. 3 and 5) but each being driven by roller 34 and each passing over the idler roller 35 at the opposite end of the oven. Drive roller 34 is conventionally driven by a motor 37 through a suitable speed reduction transmission 38. Said motor 37 may either be of a variable speed type or may instead be a D.C. type of commercially available type adapted to be driven by circuitry as described in co-assigned U.S. Pat. No. 4,152,631; of Dennis M. Weinberg et al, entitled "Process Time Control System", which is adapted to control the energization of the motor to provide a preselected time for a product to travel the distance between entrance 22 and exit 23.

Alternatively, the individual belts 25a, 25b may be driven by separate sections of roller 34 which, for this purpose, may be driven by two separate motors of the general character indicated so that the two belts 25a, 25b may travel at the same or different speeds. Although two belts are thus indicated, it is also within the invention to provide a single belt for constituting conveyor 25. Belts 25a, 25b may be of a chain or metal bar link character formed of a suitable metal such as stainless steel whereby the belt may be exposed to higher than normal temperatures within the oven such as may be desired to be produced therein for providing self-cleaning of the conveyor and interior surfaces of tunnel 21.

Entrance 22 and exit 23 are each defined by respective tubular extensions 43, 44 of rectangular cross-section which extend from opposite ends of an elongated tubular main body 45 of the oven. Body 45 is comprised of joined individual sections, such as designated at 45a, 45b, 45c which are joined at flanges as indicated generally at 47, 48 (FIG. 4) which are clamped together at intervals along their peripheral extent by bolts 49 or other suitable clamping devices. Similarly, extensions 43, 44 are secured to opposite end faces of body 45, i.e., to the ends of sections 45a, 45c by bolts 51 which extend through end plates 52, 53 of the respective extensions. Also, as will be noted, said extensions 43, 44 narrow down or reduce in vertical dimension as they extend outwardly to provide a spout-like character such that the cross section of entrance 22 and exit 23 will be less than the cross section of the tunnel 21.

In accordance with the invention, the entrance 22 and exit 23 are located so that the highest point of each is no higher, and preferably slightly lower, than the floor 40 of the cooking chamber or tunnel 21. Because of this orientation of the entrance and exit opening, conveying of food products occurs within chamber 21 heated, oxygen-starved, heated atmosphere for achieving substantially flameless cooking of such food products within the chamber. Although heating is primarily by infrared radiant energy, gases present within chamber 21 tend to be heated and, since they tend to rise, are effectively trapped within chamber 21 except to the extent vented as described hereinbelow.

Heating of such products, is not, however, carried out by the presence of a heated atmosphere, except to a secondary extent. Rather, food products are primarily heated by radiation from the interior surfaces, such as the floor 40 and roof 41 of chamber 21, of infrared energy. Therefore, it is to be understood that the interior surfaces of oven chamber 21 constitute infrared emitters, these being heated by an arrangement to be described shortly, but being at predetermined temperatures substantially lower than may be typical of gas burners, glowing electric broiler elements, quartz lamps, etc., which operate at very high temperatures. Typical surface temperatures, such as for the roof and floor 40, 41, may be maintained in the hundreds of degrees. Merely as an example, floor 40 may be maintained at 400° F. and roof 41 at 475° F., but much higher temperatures are possible, as noted below.

As cooking takes place within tunnel 21, and particularly where the products being heated are steaks, chops, or other greasy meats, vapors including steam, grease vapor, and other vaporized volatile constituents are produced within tunnel 21, thus producing steam and smoky off-gases characteristically associated with such cooking. Food grease, for example, may begin vaporizing at relatively low temperatures such as about 150° F., as noted.

To provide for the controlled removal of these various gaseous products as they are created during cooking, there is provided at the top of tunnel 21 a conduit 55 having a butterfly valve 56 so that the steam and vapors, smoke, etc. may be selectively vented by manipulation of a control 57 which controls the position of valve 56. Said conduit 55 is preferably connected to a ventilation system. Accordingly, valve 56 provides selective venting of the steam and other vapors produced within chamber or tunnel 21 as the food products are cooked therein. Although the steam and vapors may be discharged to the atmosphere through filters, etc., they instead may be condensed by known condensing arrangements. The aspect of selective venting of such steam and vapors involves removing only an excess of these products of heating, rather than extracting all steam, vapor, smoke, and the like from chamber 21. One may normally expect, therefore, a very slight overpressure to exist during use of the oven, just as would tend to exist within the envelope of a hot-air balloon.

Accordingly, there is developed during cooking an oxygen-starving atmosphere including such steam and vapors. This environment in chamber 21 ensures that incoming food products will not be exposed to a sufficiently oxidizing atmosphere that combustion can result. Furthermore, air, grease, or grease vapors will be precluded from burning or flaing up. Valve 56 is adjusted to provide such slight positive pressure and thus to maintain the oxygen-starved atmosphere but without permitting substantial escape of steam and other vapors from the entrance 22 or exit 23.

Also to be noted is the provision of a drain conduit 59 having a control valve 60 therein to permit grease selectively to be drained from the lowest point of chamber 21, it being understood that broiling of steaks, chops, and other greasy foods will tend to result in the accumulation of hot grease which may be either continuously or periodically removed through conduit 59.

Because air, when heated, is trapped and relatively quiescent within tunnel or chamber 21, rather than spilling out the tunnel entrance and exit, the new oven is energy efficient.

Figure 1:
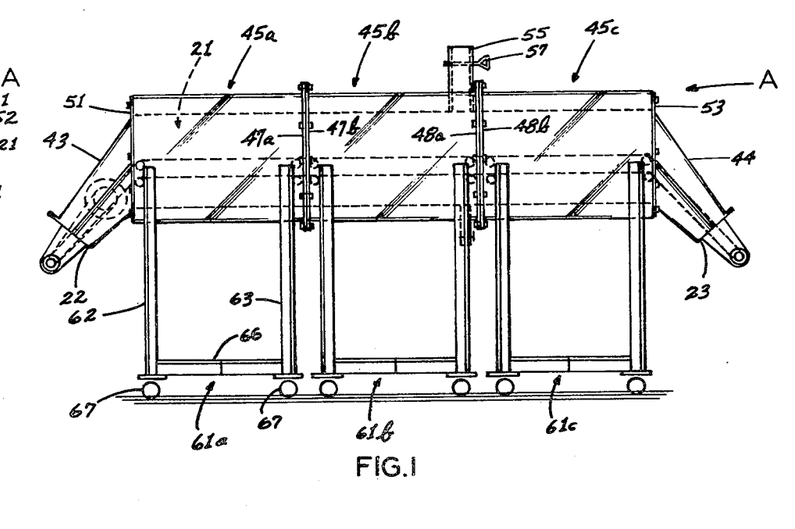
FIG. 1 is a side elevation view of a so-called humpback oven-broiler constructed in accordance with and embodying the present invention.
Figure 3:
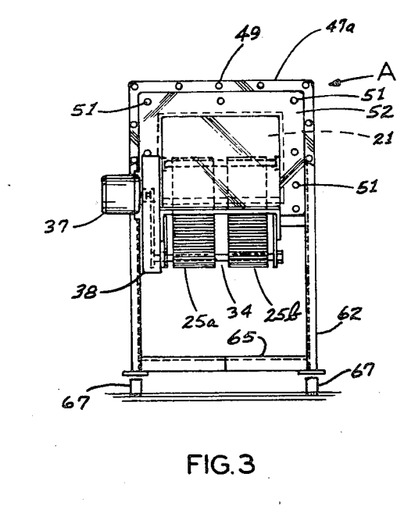
FIG. 3 is a left end elevation view of the oven-broiler of FIG. 1.

Referring to FIGS. 1 and 3, units 45a, 45b and 45c are each individually supported by respective individual mobile bases 61a, 61b, 61c. These bases are of identical or similar character. Hence, base 61a is representative. It includes four vertical legs 62, 62' and 63, 63' joined at their lower ends by transverse braces, as at 65, and longitudinal braces, as at 66. Carried at the bottom end of each leg is a respective roller-type caster 67 which is free to swivel on a vertical axis.

Figure 2:
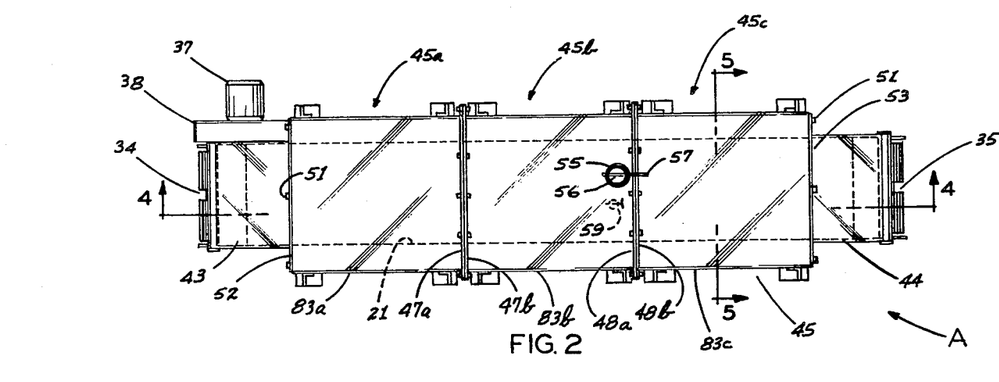
FIG. 2 is a top plan view of the oven-broiler embodiment of FIG. 1.
Figures 4, 5:
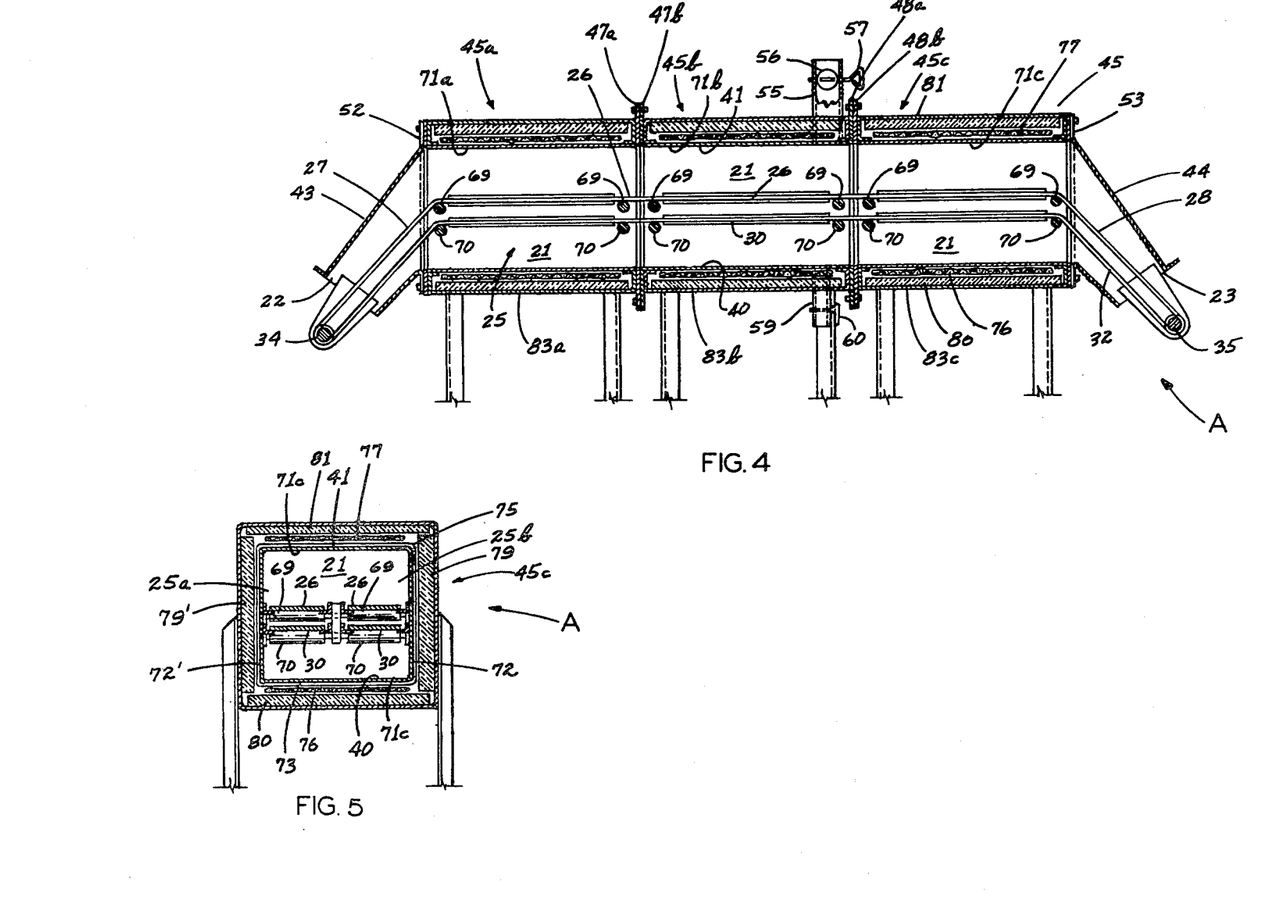
FIG. 4 is a longitudinal cross section view of the oven-broiler of FIG. 1, as taken along line 4—4 of FIG. 2.
FIG. 5 is a transverse cross sectional view taken along line 5—5 of FIG. 2.
Figure 6:
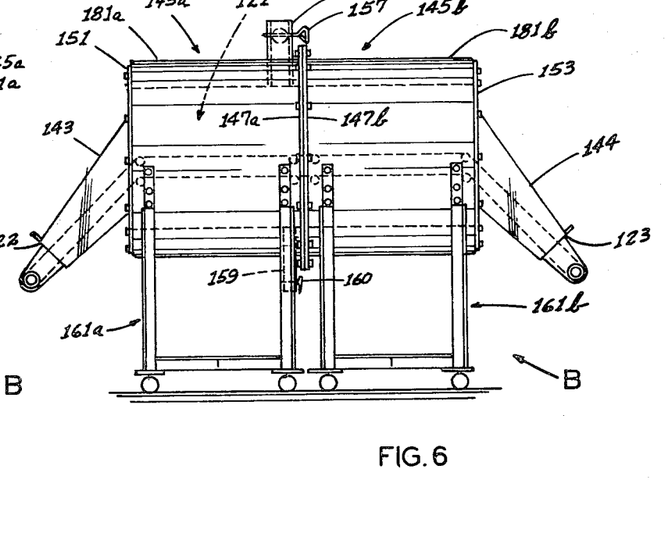
FIG. 6 is a side elevation view of a further embodiment of a humpback oven-broiler of the invention.
Figure 7:
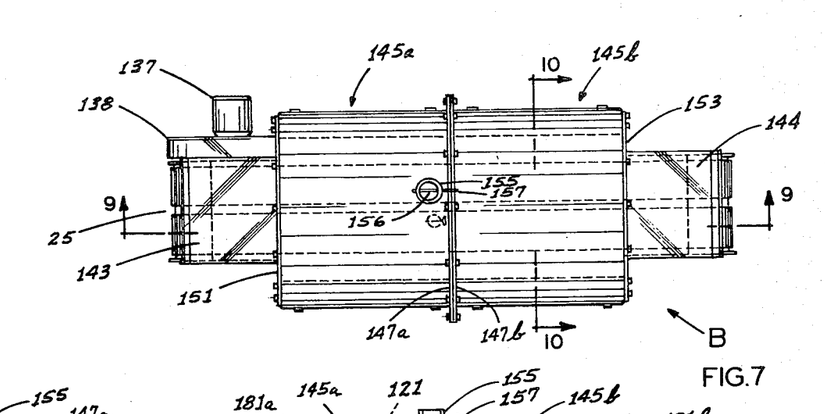
FIG. 7 is a top plan view of the embodiment of FIG. 6.
Figure 8:
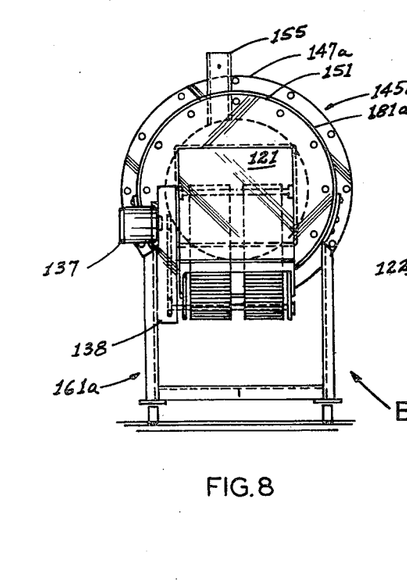
FIG. 8 is a left end elevation view of the oven-broiler of FIG. 6.

When units 45a, 45b and 45c are joined, as shown in FIGS. 1, 2 and 4, oven A is movable as a single unit. But when flanges 47, 48 are separated thereby separating units 45a, 45b and 45c each is free to be individually moved.

In this regard, although oven A is seen to comprise three joined units, an oven of the invention may be formed by a greater or lesser number of units. It may have, for example, but a single unit constituting middle unit 45b, said extensions 43, 44 being connected at opposite ends of said single unit. Or it may comprise two units or many more. Thus, the oven is suited for being configured in a variety of lengths in accordance with the food product to be heated. For certain kinds of baking applications, for example, units of the invention may be joined together readily to provide a relatively long composite oven. But, for the purpose of reconfiguration, or for cleaning of the individual oven units, the joined units are readily disassembled.

Depending upon the length of the composite oven, where such is realized by the interconnection of a plurality of joined units of the character described, various arrangements for supporting conveyor 25 therein may be utilized. Merely for purposes of illustration, each of units 45a, 45b and 45c includes rollers 69 at its opposite ends for supporting the portion of the main belt reach 26 in horizontal configuration as well as additional rollers 70 for supporting similarly return reach 30. However, for ovens of the length realized by utilizing only a single section, such as section 45b, it is not required to utilize roller supports for conveyor 25. Rather, the reaches of the conveyor may merely be supported on guides such as realized by transverse lengths of stock, preferably of corrosion resistant steel alloy or stainless steel, extending between the opposite side walls at intervals along the length of each oven section.

Therefore, ovens of the present invention are seen to be of a modular character in which individual modules, e.g., of six foot lengths, may be coupled in lengths of 30 feet, 36 feet, etc., as may be desired for providing travel of products, as during baking, through heating conditions over a relatively long period of time.

It is also possible to realize an oven of the invention by utilizing a hearth which extends the length of tunnel 21, as revealed in co-assigned U.S. patent application Ser. No. 956,869 of H.D. Wells et al now U.S. Pat. No. 4,245,613. In such an arrangement, a metal hearth forms the floor of the cooking chamber or tunnel, the conveyor main reach lying along the surface of such hearth for maintaining products in close proximity. However, for use of an oven of the invention for broiling of steaks, chops and other greasy foods where the product is carried directly by the conveyor rather than in a pan, broiler, plate or the like, it is preferred to support the conveyor main reach, as illustrated especially in FIG. 5 so that the food product is centered more or less within the vertical extent of the oven chamber for relatively even exposure to infrared energy radiated by the floor 40 and ceiling 41 of the tunnel oven.

Referring now to FIGS. 4 and 5, tunnel 21 is seen to be constituted by a length of tubular material 71a, 71b, 71c in each of the oven sections 45a, 45b, 45c, respectively, such tubular material extending the length of each unit and being entirely closed to provide a continuously closed and protected surrounding for conveyor 25 and products carried thereon. Referring to FIG. 5, it will be seen that section 71c of such tubing is provided with substantially vertical side walls 72, 72' and horizontal surface 73 constitutes floor 40 and an upper horizontal surface 74 constituting ceiling 41, with the horizontal and vertical portions being joined at rounded corners typically shown at 75.

Since the heating arrangements of each of sections 45a, 45b and 45c is identical, the heating arrangement for section 45c is specifically described only for section 45c, as shown in FIGS. 4 and 5.

For heating of floor 40, there is provided an infrared heater panel 76 which lies along horizontal floor portion 73 of the tubular chamber 21 and a corresponding infrared heater panel 77 is provided which lies along the upper surface 74 of the tubular oven chamber. Each of these infrared heater panels may be of the form disclosed in Wells U.S. Pat. No. 3,809,859 for directly causing heating of the corresponding floor 40 and roof 41 to provide radiation of infrared energy upwardly and downwardly, respectively, into tunnel 21. Although not shown, there may be a respective thermocouples associated with each of these heating panels for sensing the temperature thereof. Direct sensing of the temperature in accordance with the invention described and shown in the above described U.S. patent application No. 956,869 now U.S. Pat. No. 4,245,613 is preferred.

Extending around the four walls of the oven and on the exterior of said heating unit 76, 77 are blankets, as at 79, 79' and 80, 81, of fibrous thermal insulation material, such as a suitable refractory fiber, for providing thermal insulation around chamber 21. The heating arrangement and thermal insulation is entirely surrounded by a closed length of tubular material, such being designated at 83a, 83b and 83c for the three oven sections 45a, 45b and 45c, respectively. Hence, both the inner and outer surfaces of each of the sections of oven A are completely closed. Further, openings into the space between the inner and outer structures are closed by the corresponding flange plates 47a, 47b, 48a, 48b and also by corresponding plates at the outer ends of oven sections 45a, 45c.

Because of this entirely closed construction, an oven realized in accordance with the present invention may attain the rigorous standards and specifications specified by governmental regulations for aseptic preparation and food processing applications.

The material constituting the inner tubular liner or members 71a, 71b, 71c and outer enclosures 83a, 83b, 83c of the respective oven units may be of various steels, alloys, ceramic, or ceramic-coated metals. tubular inner members 71a, 71b, 71c may also be of aluminized steel. Aluminum may be used for structure of the oven if high temperatures are not required. Stainless steel is preferable for cleaning, durability, and exposure to high heat conditions, such as broiling of meat.

In this regard, the muffle type of arrangement of a tubular inner chamber, surrounded by heating elements and insulation material and in turn enclosed or surrounded by a tubular outer enclosure, provides an oven in which infrared heating can be produced at temperatures far higher then heretofore used in tunnel ovens of the type employing infrared heating. Although ovens of the present invention may utilize temperatures ranging broadly from 200° to 1200° F., an oven of the invention can attain infrared source temperatures of 1000°–1200° F. or more. In typical fast food service or food processing, tunnel ovens are operated at much lower temperatures, and ranging from about 200° F. to about 800° F.

Therefore, ovens of the invention can be self-cleaning, with grease droppings, food residue, etc. be reduced to merely a fine ash.

Referring now to FIGS. 6–10, designated generally by reference character B is a further embodiment of an oven of the invention. The oven is comprised of a pair of individual joined sections 145a, 145b. Units 147a, 147b are secured together by bolted or otherwise suitably joined flanges 147a, 147b. Bolted to the opposite ends by means of flange plates 151, 153 are inclined tubular extensions 143, 144, which, as in embodiment A, are of rectangular cross section.

Oven B is provided with a tunnel or cooking chamber 121 with which said tubular extensions 143, 144 communicate. A conveyor 125 extends through the oven in the same manner as with oven A, including a horizontal main reach 126 for conveying products through the oven, as well as inclined reaches 127, 128 for ingress and egress of food products relative to an opening 122 and exit 123, respectively. A motor 137, through a transmission 138, drives a suitable belt or belts of conveyor 125 in the same manner as for oven A.

Unlike oven A, chamber or tunnel 121 is of circular cross section, being formed by tubular inner members 171a, 171b of the respective units. These inner members may be of the same material as preferred for oven A, providing an elongated horizontal tunnel which is fully closed around the sides but opens at opposite ends to extensions 143, 144. Further, as in oven A, these extensions have their respective openings 122, 123 located below a lowest point within the oven chamber 121 to entrap heated, oxygen-starved atmosphere within it.

Figures 9, 10, 16:
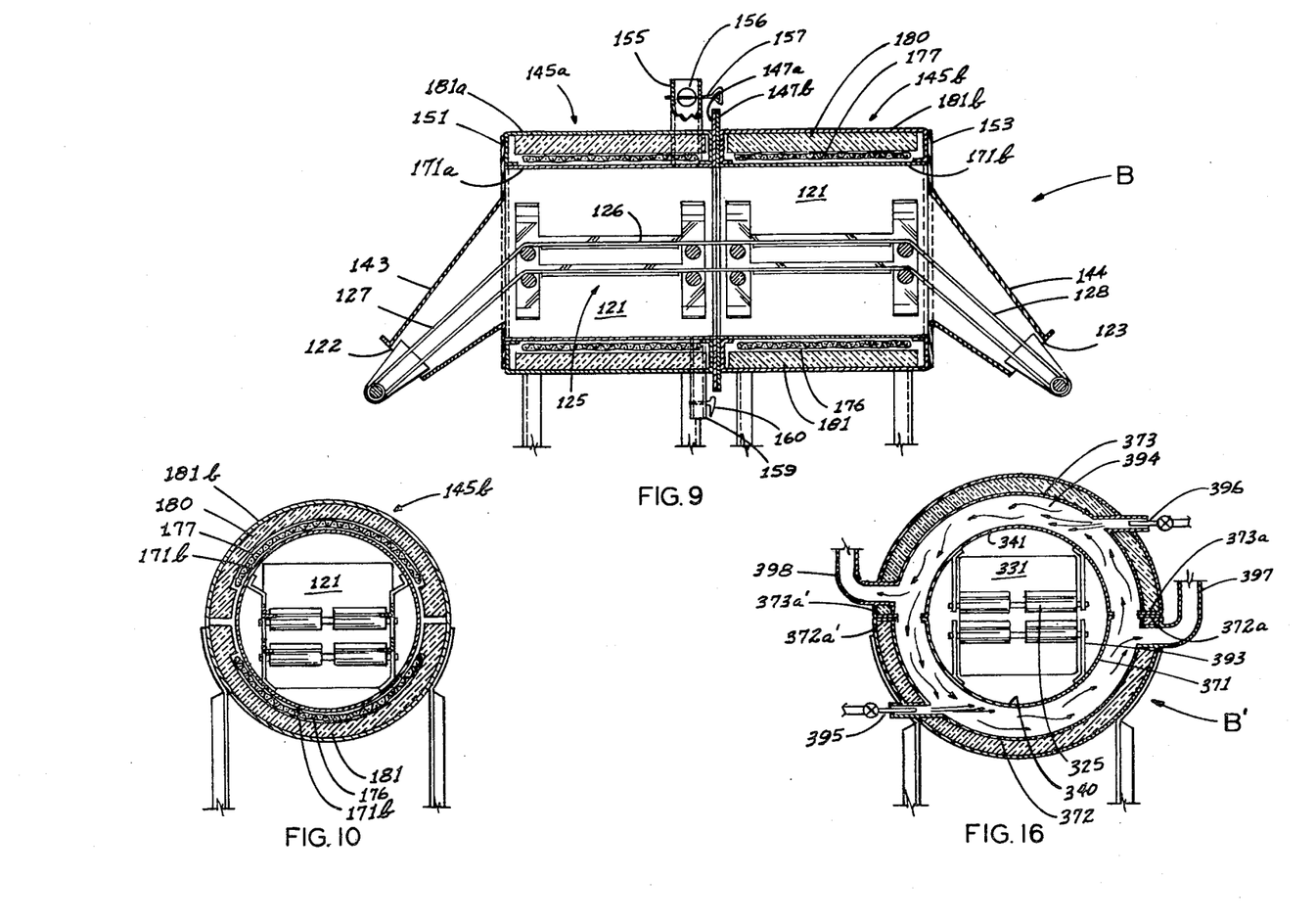
FIG. 9 is a longitudinal cross sectional view of the oven-broiler of FIG. 6, taken along line 9—9 of FIG. 7.
FIG. 10 is a transverse cross sectional view taken along line 10—10 of FIG. 7.
FIG. 16 is a cross sectional view similar to FIG. 10 and illustrating a combustion chamber heating arrangement for the oven-broiler utilizing gas burners, as contrasted with an electrical heating arrangement of FIG. 10.

Similarly, the outer enclosure of the oven units 145a, 145b are constituted by respective tubular outer members 183a, 183b, which also are of circular cross section, as shown in FIG. 10.

Like oven B, the tubular oven structures are supported at approximately waist or chest height. Thus, a caster-equipped base 161a, 161b is provided for each of units 145a, 145b, respectively, and of the same form as the bases for each of the units of oven A. Accordingly, the two units 145a, 145b may be separated at flanges 147a, 147b for changing the lengths of the oven as by inserting another unit, or for cleaning purposes, adjustment, and so forth.

Provided at the top of chamber 121 is a vent conduit 155 having a butterfly valve 156 in it adjusted by a control knob 157 for selective venting of the steam and other vapors produced in chamber 121 upon cooking of food products. Vent 155 communicates with the highest part of chamber 121. Similarly, at the bottom of the chamber, there is provided a drain conduit 159 including a control valve 160 for draining off grease from the lowest point of chamber 121.

Referring now to FIGS. 9 and 10, each section is provided with electrical heating arrangements, and that for unit 145b is representative of both units. Thus, inner tubular member 171b is heated at its bottom and top by electrical infrared heater panels 176, 177 which conform to said inner tubular member and lie proximate the outer surfaces thereof for causing the material of the inner tubular structure to be heated to predetermined temperatures sufficient for the emission of infrared radiant energy to the food product being conveyed through chamber 121. As in oven A, the heating panels are surrounded by fibrous thermal insulating material of a refractory nature, as at 180, 181.

The circular cross section of the units of oven B provides certain advantages. Because the stresses produced in the tubular members 171a, 171b are more evenly distributed, maximum permissible temperatures in oven B may be very high, such as 1000° F. or more, without causing undue stresses which may otherwise tend to cause deformation of the materials of the oven or possible cracking and fatiguing. Oven B also avoids undesirable dimensional distortion over the range of temperatures possibly attained during operation. Also, from a manufacturing veiwpoint, circular sections offer certain advantages.

But from the viewpoint of heating of the food products conveyed through the oven, another advantage is found to be true of an oven of cross section other than rectangular. Since the upper and lower interior surfaces of the heating chamber 121 are neither planar nor parallel, the radiation of infrared energy from one surface is not evenly and normally directed toward a corresponding planar surfaces on the opposite side of the chamber. Accordingly, there is less tendency in oven B for the upper surfaces to heat the lower surfaces, and vice versa. Therefore, it is possible to attain in oven B a differential of upper and lower temperatures much greater than oven A or other prior art tunnel ovens of rectangular cross section. Such a differential may be very desirable for cooking certain kinds of food products requiring that temperature of the radiation source to which one surface of the food product is exposed be considerably different from that of the source to which the other surface is exposed. For example, in the cooking of a steak, it may be quite desirable to cook the upper surface at a temperature which causes a desirable browning and rich, dark coloration of the surface but to avoid heating the bottom surface to such an extent.

Referring to FIGS. 11–15, designated generally by reference character C is a further embodiment of an oven of the invention, and comprised of three individual joined sections 245a, 245b and 245c. The units are secured together by flanges, as at 247a, 247b and 248a, 248b. These flanges are bolted together as in previous embodiments A and B, or otherwise suitably joined. Extending from the outer ends of sections 245a, 245c, are respective tubular extensions 243, 244 which are of rectangular cross section.

Like oven B, the new embodiment oven C includes a tunnel or cooking chamber 221 extending through the oven between said tubular extensions 243, 244. A conveyor 225 carries food products up the inclined reach for ingress through entrance 222, thence through the tunnel and, having been heated, down the inclined reach at the opposite end for egress and delivery through exit 223. Each of units 245a, 245b and 245c is similarly provided with a caster-equipped base, as at 261a, 261b and 261c for movement individually or for movement of the whole oven.

Figures 14, 15, 17:
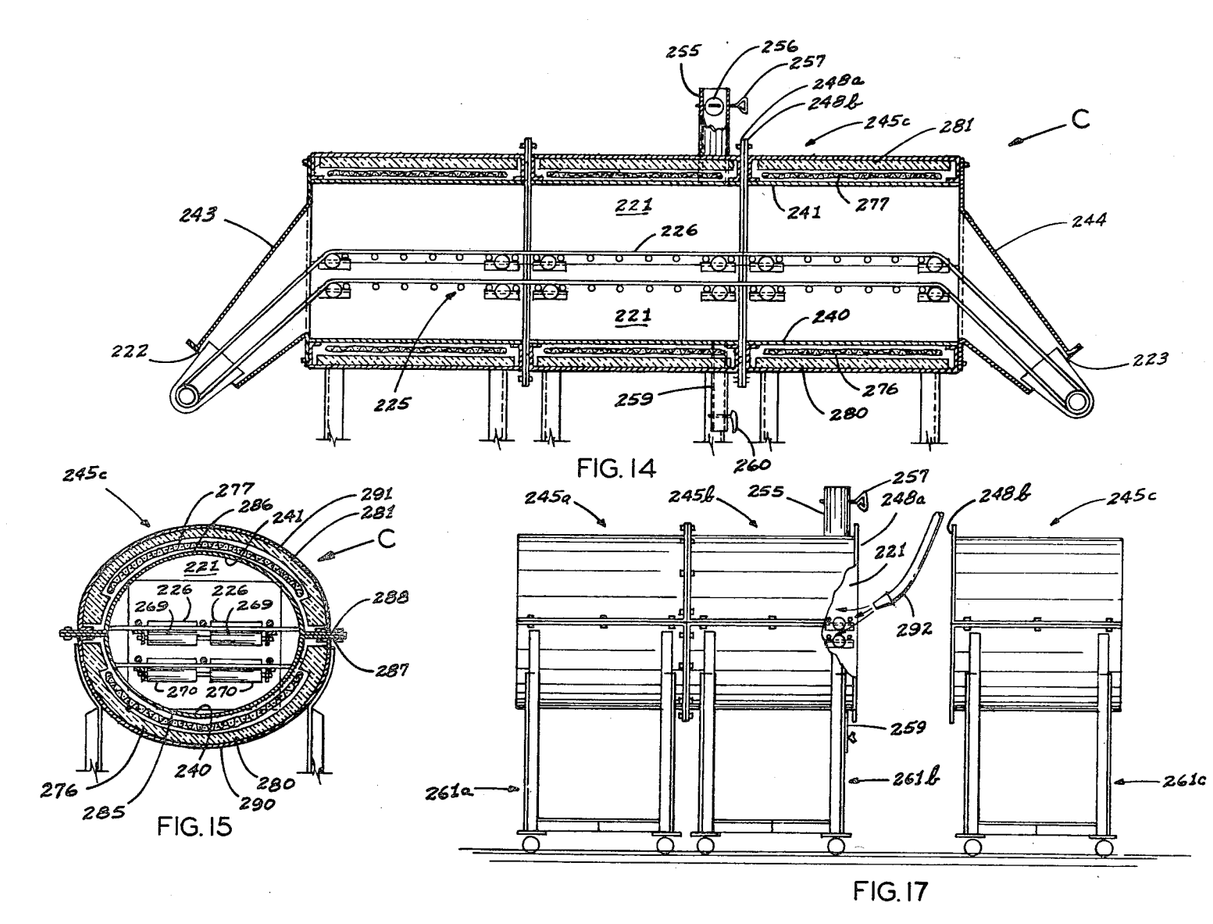
FIG. 14 is a longitudinal cross sectional view taken along line 14—14 of FIG. 12.
FIG. 15 is a transverse cross sectional view of the oven-broiler of FIG. 11, taken along line 15—15 of FIG. 12.
FIG. 17 is a side elevation view, similar to FIG. 11, and illustrating disassembly and cleaning of sections of the oven-broiler, portions of one section being shown cut away.

With reference now particularly to FIGS. 14 and 15, the structure of each of units 245a, 245b and 245c is seen to constitute a tubular inner member and tubular outer member, but such are formed different from oven B and with different cross section. Unit 245c is representative of each of the units and reference is made, therefore, to FIG. 15 wherein it is seen that the unit is of tubular construction. Unit 245c has a tubular inner structure which defines a floor 240 and ceiling 241 each formed by respective lower and upper half-sections 285, 286. These together define an elliptical cross section for chamber 221. Sections 285, 286 have respective flanges 287, 287' and 288, 288' which extend horizontally outward from the respective members and are bolted together. Similarly, there are provided outer tubular half-sections 290, 291 which are secured to the above-noted flanges so that the upper and lower halves of oven unit 245c are separable along an axis of symmetry extending horizontally through the center of the oven chamber.

The conveyor reaches are supported within tunnel 221 by rollers 269, 270 or by any other suitable support structure, depending upon the length of the oven to be realized, so that the main reach 226 of the conveyor will convey products through tunnel 221 at a point approximately vertically centered therein for even exposure of food products to the infrared radiant energy emanating from floor 240 and roof 241.

Figure 11:
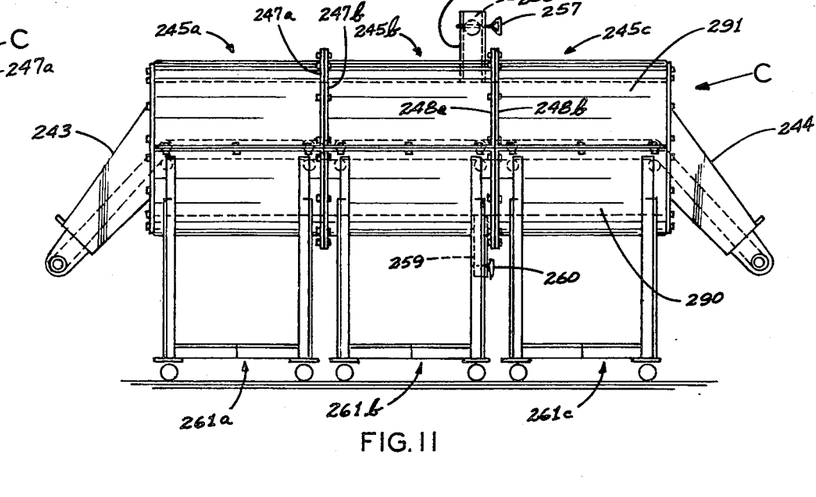
FIG. 11 is a side elevation view of yet another embodiment of a humpback oven-broiler of the invention.
Figure 12:
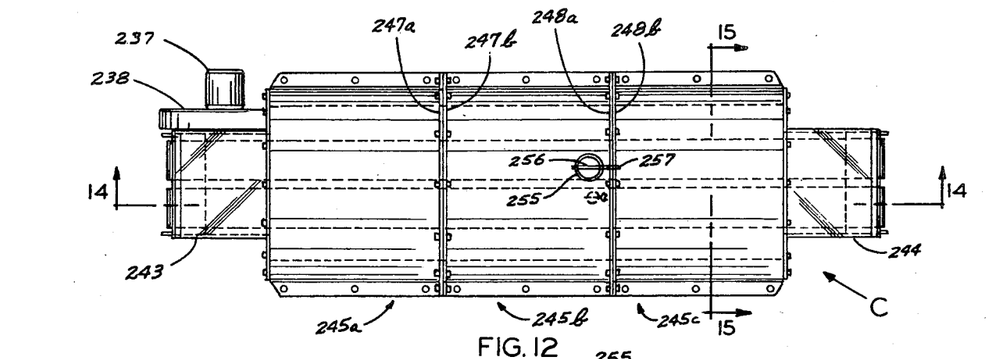
FIG. 12 is a top plan view of the oven-broiler of FIG. 11.
Figure 13:
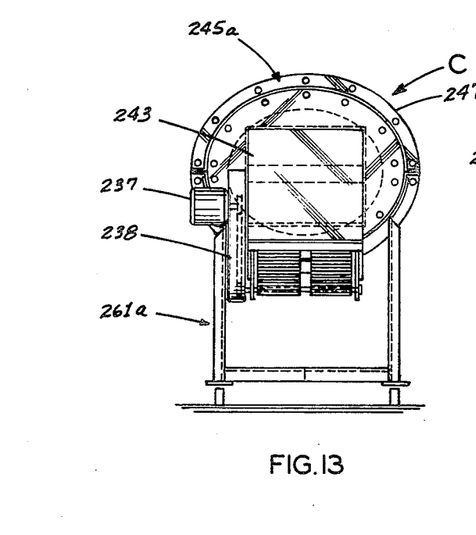
FIG. 13 is a left end elevation view of the oven-broiler of FIG. 11.

Heating of the floor and roof is provided by respective infrared radiant heaters of an electrically energized type as shown at 276, 277 which closely conform to the curved surface of the upper and lower half sections 285, 286, for directly heating them to predetermined temperatures, as controlled preferably by direct-sensing thermocouples or other sensing elements. Provided between the respective heater panels and the other half sections 290, 291, as indicated at 280, 281, are layers of fibrous thermal insulating material of a refractory type, with the thickness and thermal characteristics thereof being sufficient for preventing the outer surface of the oven unit from becoming excessively hot. With reference to FIGS. 11, 12 and 14, it is apparent that there is provided at the top of chamber 121 a vent conduit 255 including a butterfly valve 256 which may be positioned by a control 257 for providing selective venting of the steam and other vapors within chamber 221, all for the same purposes as described hereinabove with regard to oven A. There similarly also is provided at the bottom of the chamber a drain conduit 259 including a valve 160 therein, again for the same purposes as previously described.

Although a dual conveyor belt arrangement is shown merely for purposes of illustration, it will be apparent that other conveyor arrangements including a single belt conveyor, whether of the mesh or chain type or other known types of conveyors utilized in food processing and heating operations, may instead be provided consistent with the objectives of transporting food products through tunnel 221 along substantially the vertical center of the tunnel for exposure evenly to infrared radiant energy emanating the roof 241 and floor 240. The belt arrangement is driven, as before, by a motor 237 interconnected with a transmission 238, all as generally described with reference to oven A.

The elliptical cross section of tunnel 221 of oven embodiment C is especially advantageous in providing not only extremely effective infrared heating of food products conveyed through the tunnel, but also permitting an extremely high differential of temperatures with respect to the top and bottom of the oven, while allowing precise temperature control and consistency of cooking for more uniform and more reproducible cooking of food products. Like oven B, the differential of temperature achievable between the ceiling and floor of the tunnel is greater than with oven A. Additionally, the split half-sections of the oven, effectively dividing each of oven units 245a, 245b, 245c into upper and lower sections, allows the distribution of stresses within the oven without undesirable effects, as well as facilitating the manufacture, assembly, and disassembly of the oven units and rendering this embodiment even more easily produced by production-line techniques.

Like oven embodiments A and B, oven C is readily assembled to provide a single unit, dual units, or a multiple unit oven of indefinite length, for achieving a cooking chamber of desired length.

Referring to FIG. 17, ovens of the invention are readily separated at the flanges between sections, as is demonstrated for embodiment C. In FIG. 17, section 245c has been disconnected from section 245b by separation of flanges 248a, 248b, thus allowing the nozzle of a steam hose 292 to be directed into the interior or chamber 221 for cleaning of the oven, such as is desirable in ovens utilized for food processing.

Further, the construction of the ovens in accordance with the invention, allows the heating and electrical connections to be sealed between the inner and outer sections, providing completely closed, secure surfaces, not only on the interior of the oven but also the exterior. Thus, the new ovens are readily hosed, sprayed and easily cleaned without introduction of moisture to the electrical components. For example, ovens of the invention are cleanable by directing a water spray, such as including a detergent, antiseptics, and so forth, as sometimes preferred in food processing operations.

The intrinsic cleanliness of the new ovens makes them particularly useful also for aseptic food processing as well as other operations, such as electronic materials and circuits processing, requiring "clean room" techniques.

Referring now to FIG. 16, there is illustrated a modification of oven B and such is identified generally as B'. This oven includes a circular cross section tunnel 331 in which is provided a suitable horizontal conveyor. The chamber is defined by a circular tubular member 371 containing support structure, as at 393, for appropriately supporting the reaches of conveyor 325 therein.

Positioned concentrically around said inner tubular member 371 is a larger diameter tubular member formed of a semi-circular lower section 372 and upper section 373 joined at suitable flanges, as shown at 372a, 372a' and 373a, 373a'. There is thus defined between the outer surfaces of tubular member 371 and the inner surfaces of tubular sections 372, 373 an annular combustion chamber 394. Opening into lower and upper portions of chamber 394 are corresponding lower and upper gas burners of the jet type 395, 396 which are individually adjustable for controlling the extent of heating the lower and upper portions, respectively, of tubular member 371, thereby to provide selective control of the temperature of the floor 340, and ceiling 341 of chamber 331. As is evident, these burners cause combustion gases to circulate counterclockwise around tubular member 371 within chamber 394. Flues are provided, as at 397,398 for the removal of the gaseous products of combustion.

Accordingly, it is seen that oven B' represents an illustration of the applicability of an oven constructed in accordance with the invention to heating by means of gas burners, rather than the electrical burners which are shown in connection with other embodiments. This gas heating arrangement may also be used for ovens of embodiments A and C, as appropriately modified.

Although a single combustion chamber 394 is shown to extend completely around the tubular inner structure 371 of oven B', baffles or separations may be provided for effectively dividing chamber 394 into upper and lower portions. That may be desirable where the attainment of greater possible temperature differentials between the upper and lower sections of the oven are desired. But, ordinarily, a single continuous combustion chamber of annular form is utilized so that the oven may be heated by operation of only one of the burners 395, 396, if desired. Chamber 394 is insulated as above.

Although each of embodiments A, B and C has inclined extensions through which the conveyor extends exteriorly of the oven in an inclined way and so that the entrance and exit are placed below floor level of the tunnel-form chamber, modular units of the oven may be joined into a multiple-unit oven in which the conveyor extends rectilinearly, horizontally from opposite ends of the oven, with or without extensions, but without being inclined. Although heated air is not then trapped in the oven to the extent characteristically achieved by the inclined extensions, as would be desired for cooking of greasy food products such as steaks and chops, etc., the advantages of forming the oven into a desired length corresponding to the number of joined units, with attendant ease of assembly, disassembly and cleaning, are fully realized. Such an oven is very useful for baking or other flameless heating of certain food products with which one is not concerned with combustion of natural greases, oils or vapors.

Accordingly, it is seen that the various objects of the invention are attained and other advantageous results are achieved by the invention.

Although the foregoing includes a description of the best mode contemplated for carrying out the invention, various modifications are contemplated.

Since various modifications can be made in the constructions herein described and illustrated without departing from the scope of the invention, it is intended that all matter contained in the foregoing description or shown in the accompanying drawings shall be interpreted as illustrative rather than limiting.

What is claimed is:

1. An oven-broiler including a cooking chamber and a conveyor therein for conveying food products through said chamber for heating of said products by infrared emission within said chamber, and characterized by structure providing opening means for ingress and egress of products with respect to said chamber and orienting said opening means at a level lower than said chamber for causing said chamber to entrap a heated, oxygen-starved atmosphere for achieving substantially flameless cooking of said food products within said chamber, said chamber being of tunnel form and comprising an elongated tubular structure constituted by inner and outer tubular members of annular configuration defining a space between them, said inner tubular member being of heat radiative material, heating means comprising electrical infrared heater panels within said space and surrounding said inner tubular member for causing the walls of said inner tubular member to be heated to said predetermined temperatures for causing said food products to be heated by infrared radiant energy from said walls.

2. An oven-broiler according to claim 1 and further characterized by said heating panels comprising upper and lower sets of said heater panels for heating upper and lower portions of said inner tubular member for providing different upper and lower temperatures within said cooking chamber.

3. An oven-broiler including a cooking chamber and a conveyor therein for conveying food products through said chamber for heating of said food products by infrared emission within said chamber, and characterized by structure providing opening means for ingress and egress of products with respect to said chamber and orienting said opening means at a level lower than said chamber for causing said chamber to entrap a heated, oxygen-starved atmosphere for achieving substantially flameless cooking of said food products within said chamber, said cooking chamber being of tunnel form and comprising an elongated tubular structure of heat radiative material, and heating means extending around at least part of said tubular structure for heating interior surfaces of said structure to predetermined temperatures sufficient for cooking of said food products in said cooking chamber by the radiation of infrared energy from said interior surfaces of said tubular structure for impingement upon said food products therein, said heating means comprising a housing for surrounding said tubular structure and defining between said housing and tubular structure a combustion chamber extending annularly around said tubular structure, and burner means for selectively producing combustion of fuel within said combustion chamber.

4. An oven-broiler according to claim 3 and further characterized by said burner means constituted by upper and lower burners for heating upper and lower portions of said tubular structure for providing different upper and lower temperatures within said cooking chamber.

5. An oven-broiler including a cooking chamber and a conveyor therein for conveying food products through said chamber for heating of said food products by infrared emission within said chamber, and characterized by structure providing opening means for ingress and egress of products with respect to said chamber and orienting said opening means at a level lower than said chamber for causing said chamber to entrap a heated, oxygen-starved atmosphere for achieving substantially flameless cooking of said food products within said chamber, said cooking chamber being of tunnel form and comprising an elongated tubular structure of heat radiative material, and heating means extending around at least part of said tubular structure for heating interior surfaces of said structure to predetermined temperatures sufficient for cooking of said food products in said cooking chamber by the radiation of infrared energy from said interior surfaces of said tubular structure for impingement upon said food products therein, said tubular structure comprising a tunnel of horizontal orientation, said entrance and exit defining means each providing respective inclined extensions of said tunnel, said tubular structure comprising at least one tubular sectional unit including flanges at opposite ends thereof for being securable to at least one corresponding unit in end-to-end configuration, said unit including a tubular inner member forming said tunnel, said heating means closely surrounding at least a portion of the periphery of said inner member for heating same to said predetermined temperatures, a tubular outer member surrounding and enclosing said inner member and said heating means, and means defining flanges at opposite ends of said unit for flange-to-flange securement to a corresponding unit, said entrance and exit defining means comprising inclined extensions of said inner member.

6. An oven-broiler according to claim 5 and further characterized by said unit having a base for supporting said unit separate from any other corresponding unit, said base including casters for rendering said unit mobile.

7. An oven unit including a heating chamber in the form of a tunnel and means for conveying products through said chamber for infrared heating of said products and characterized by a tubular inner structure defining said tunnel, means surrounding said tubular inner structure for providing heating thereof for emission of infrared radiant energy into said chamber and an outer tubular structure for surroundingly enclosing said tubular inner structure and said heating means, and means for coupling of said unit to a corresponding unit in end-to-end relationship to provide a multiple unit oven.

8. An oven including a heating chamber in the form of a tunnel and a conveyor therein for conveying food products through said chamber for infrared heating of said food products, and characterized by said tunnel being tubular in form and constituted by at least one oven unit including a tubular inner member, means surrounding said tubular inner member for heating of surfaces of said tubular inner member to predetermined temperatures for emission of infrared radiant energy into said chamber, and an outer tubular member for surroundingly enclosing said tubular inner member and said heating means, means at opposite ends of said tubular inner and outer members for coupling of said unit to a corresponding unit in end-to-end relationship to provide a multiple unit oven, and means for rendering said unit mobile.

9. An oven according to claim 8 and further characterized by said unit having a base for individually supporting said unit separate for any other corresponding unit, said base including casters constituting said means for rendering said unit mobile.

10. An oven according to claim 9 and further characterized by said means for coupling of said unit comprising flanges at opposite ends of said tubular inner and outer members.

11. An oven according to claim 10 and further characterized by means at opposite ends of said oven for defining an opening and exit at the opposite ends of said chamber, and orienting said entrance and exit each at a level lower than said chamber for causing said chamber to entrap a heated, oxygen-starved atmosphere for substantially flameless cooking of food products within said chamber.

12. An oven according to claim 11 and further characterized by means communicating with said inner tubular member for selectively venting gases and vapors within said chamber and drain means for communicating with said inner tubular member for selective draining of liquids from said chamber.

13. An oven according to claim 8 and further characterized by said means for heating comprising a combustion chamber and gas burners for providing combustion within said combustion chamber.

14. An oven according to claim 8 and further characterized by said means for heating comprising a plurality of electrical heating panels surrounding said tubular inner member.

15. A modular oven including a heating chamber in the form of a tunnel and means for conveying products through said chamber from one end to the other for infrared heating of said products, and characterized by said oven comprising a plurality of units joined in end-to-end relationship, each of said units comprising a tubular inner structure, definind a portion of the length of said tunnel, means surrounding said tubular inner structure for heating surfaces thereof to predetermined temperatures for emission of infrared radiant energy into said tunnel portion, said units being separable for cleaning or reconfiguration of said oven.

16. A modular oven according to claim 15 and further characterized by said units each being supported on a mobile base.

17. A modular oven according to claim 15 and further characterized by said tunnel having a circular cross section.

18. A modular oven according to claim 15 and further characterized by said tunnel having an eliptical cross section.

19. An oven-broiler having a tunnel-form cooking chamber and a conveyor therein for conveying food products through said chamber for heating of said food products by infrared emission within said chamber, and characterized by an elongated tubular structure constituted by inner and outer tubular members of annular configuration defining a space between them, said inner tubular member being of heat radiative material, heating means within said space for causing the walls of said inner tubular member to be heated to predetermined temperatures sufficient for cooking of food products within said inner tubular member by the radiation of infrared energy from interior surfaces thereof for impingement upon said food products, said inner tubular member being of horizontal orientation and defining said cooking chamber, said structure including angled extensions at opposite ends providing downwardly inclined extensions of said inner tubular member, the outer ends of said extensions respectively providing an entrance and exit for said chamber, said conveyor comprising an endless belt having a main horizontal reach extending along the length of said inner tubular member and inclined reaches extending along said angled extensions, and a return reach extending within said inner tubular member below said main reach and along said angled extensions, whereby food products are carriable by said conveyor up one of said inclined reaches from said entrance, horizontally along said main reach during cooking, and down the other of said inclined reaches for delivery through said exit, said entrance and exit each being at a level lower than said inner tubular member for causing a heated, oxygen-starved atmosphere to be entrapped within said inner tubular member for achieving substantially flameless cooking of said food products therein.

20. An oven-broiler according to claim 19 and further characterized by vent means extending through said outer and inner tubular members for communicating with said inner tubular member at a high point therein for selectively venting steam and vapors produced upon cooking of food products therein.

21. An oven-broiler according to claim 19 and further characterized by drain means extending through said outer and inner tubular members and communicating with the inner tubular member at a low point therein for selectively draining of grease and other liquids produced upon cooking of food products therein.

22. An oven-broiler according to claim 19 and further characterized by said elongated tubular structure being constructed for coupling to corresponding tubular structures in end-to-end relationship to provide a multiple unit oven.

23. An oven-broiler according to claim 19 and further characterized by said inner and outer tubular members each being of circular cross section.

24. An oven-broiler according to claim 19 and further characterized by said inner and outer tubular members each being of eliptical cross section.

* * * * *